(12) United States Patent
Lee

(10) Patent No.: US 8,493,671 B2
(45) Date of Patent: Jul. 23, 2013

(54) THREE-PIECE OPTICAL LENS SYSTEM

(75) Inventor: Chun Sheng Lee, Taichung (TW)

(73) Assignee: Newmax Technology Co., Ltd., Taichung (TW)

( * ) Notice: Subject to any disclaimer, the term of this patent is extended or adjusted under 35 U.S.C. 154(b) by 0 days.

(21) Appl. No.: 13/337,266

(22) Filed: Dec. 26, 2011

(65) Prior Publication Data

US 2013/0163098 A1    Jun. 27, 2013

(51) Int. Cl.
*G02B 9/12* (2006.01)

(52) U.S. Cl.
USPC ............................ 359/791; 359/716; 359/797

(58) Field of Classification Search
USPC ......... 359/642, 708–716, 745–757, 759–760, 359/763–764, 767–769, 771–772, 779, 784, 359/791, 796, 797, 780, 792
See application file for complete search history.

(56) References Cited

U.S. PATENT DOCUMENTS

| 2004/0021957 A1* | 2/2004 | Isono ........................... 359/791 |
| 2010/0020419 A1* | 1/2010 | Liang et al. ................ 359/738 |

* cited by examiner

*Primary Examiner* — Darryl J Collins
*Assistant Examiner* — Gary O'Neill

(57) ABSTRACT

A three-piece optical lens system comprises, in order from the object side to the image side: a first lens element with a positive refractive power having a convex object-side surface, one of the object-side surface and an image-side surface being aspheric; a stop, a second lens element with a positive refractive power having a concave object-side surface, one of the object-side surface and an image-side surface being aspheric; a third lens element with a negative refractive power having a concave image-side surface, one of an object-side surface and the image-side surface being aspheric. A refractive index of the third lens element is N3, an Abbe number of the third lens element is V3, and they satisfy the relations: N3>1.57; V3<40. Such arrangements can reduce the volume of the three-piece optical lens system and improve the image quality of the periphery of the image.

10 Claims, 9 Drawing Sheets

THREE-PIECE OPTICAL LENS SYSTEM

BACKGROUND OF THE INVENTION

1. Field of the Invention

The present invention relates to an optical lens system, and more particularly to a three-piece optical lens system.

2. Description of the Prior Art

In recent years, with the popularity of the mobile phone cameras, the optical lens system has become smaller in size, and the electronic sensor of a general digital camera is typically a CCD (Charge Coupled Device) or CMOS (Complementary Metal Oxide Semiconductor) sensor. Due to advances in semiconductor manufacturing, the pixel size of sensor has been reduced continuously, and miniaturized optical lens systems have increasingly higher resolution. Therefore, there's an increasing demand for an imaging lens system with better image quality.

Referring to FIG. 5, conventional miniaturized lens systems mostly consist of three lens elements, from the object side to the image side: a first lens element 91 with a positive refractive power, a second lens element 92 with a negative refractive power and a third lens element 93 with a positive refractive power. However, the third lens element 93 of the above patent is positive so that the principal point is close to the image side of the system, so the back focal length of such a three-piece lens assembly is relatively long, which results in a relatively large mechanical structure. As a result, the requirement of miniaturization can not be satisfied and the image quality of the periphery of the image will be reduced.

Therefore, the present invention is aimed at providing an optical lens system which can satisfy the requirement of miniaturization and improve the image quality of the periphery of the image.

The present invention mitigates and/or obviates the aforementioned disadvantages.

SUMMARY OF THE INVENTION

The primary objective of the present invention is to provide a three-piece optical lens system capable of reducing the volume of the optical lens system and effectively flattening the edge of an image, thus improving the image quality of the periphery of the image (namely, the limb darkening)

A three-piece optical lens system in accordance with the present invention comprises, in order from the object side to the image side: a first lens element with a positive refractive power having a convex object-side surface, at least one of the object-side and an image-side surfaces of the first lens element being aspheric; a stop; a second lens element with a positive refractive power having a concave object-side surface, at least one of the object-side and an image-side surfaces of the second lens element being aspheric; a third lens element with a negative refractive power having a concave image-side surface, at least one of an object-side and the image-side surfaces of the third lens element being aspheric. In the three-piece optical lens system, the refractive index of the third lens element is N3, the Abbe number of the third lens element is V3, and they satisfy the relations: N3>1.57; V3<40.

According to one aspect of the present invention three-piece optical lens system, the focal length of the first lens element is f1, the focal length of the second lens element is f2, and they satisfy the relation: 1.4<|f1|/|f2|<3.5. |f1|/|f2| satisfies the above relation, a wide field of view can be provided and the resolution can be improved evidently. Contrarily, If |f1|/|f2| exceeds the above range, the performance and resolution of the optical lens system with a wide field of view will be reduced, and the yield rate will be low. According to another aspect of the present invention three-piece optical lens system, the focal length of the second lens element is f2, the focal length of the third lens element is f3, and they satisfy the relation: 0.3<|f2|/|f3|<1.0. If |f2|/|f3| satisfies the above relation, a wide field of view can be provided and the resolution can be improved evidently. Contrarily, If |f2|/|f3| exceeds the above range, the performance and resolution of the optical lens system with a wide field of view will be reduced, and the yield rate will be low.

According to another aspect of the present invention three-piece optical lens system, the focal length of the first lens element and the second lens element combined is f12, the focal length of the third lens element is f3, and they satisfy the relation: 0.3<|f12|/|f3|<1.0. If |f12|/|f3| satisfies the above relation, the volume of the optical lens system can be reduced and the edge of an image can be effectively flattened, thus improving the image quality of the periphery of the image (namely, the limb darkening) In addition, the arrangement of the lens elements can make the optical lens system have a relatively short total track length and provide enough space for the IR cut filter.

According to another aspect of the present invention three-piece optical lens system, the focal length of the three-piece optical lens system is f, the focal length of the first lens element and the second lens element combined is f12, and they satisfy the relation: 0.5<|f12|/|f|<1.1. If |f12|/|f| satisfies the above relation, the refractive powers of the first and second lens elements will be appropriate, and the requirement of miniaturization can be satisfied. In addition, the arrangement of the lens elements can make the optical lens system have a relatively short total track length and provide enough space for the IR cut filter.

According to another aspect of the present invention three-piece optical lens system, the focal length of the first lens element is f1, the focal length of the second lens element and the third lens element combined is f23, and they satisfy the relation: 0.3<|f1|/|f23|<1.8. If |f1|/|f23| satisfies the above relation, a wide field of view can be provided and the resolution can be improved evidently. Contrarily, If |f1|/|f23| exceeds the above range, the performance and resolution of the optical lens system with a wide field of view will be reduced, and the yield rate will be low.

According to another aspect of the present invention three-piece optical lens system, the focal length of the three-piece optical lens system is f, the focal length of the second lens element and the third lens element combined is f23, and they satisfy the relation: 1.0<|f23|/|f|<2.5. If |f23|/|f| satisfies the above relation, a wide field of view can be provided and the resolution can be improved evidently. Contrarily, If |f23|/|f| exceeds the above range, the performance and resolution of the optical lens system with a wide field of view will be reduced, and the yield rate will be low. According to another aspect of the present invention three-piece optical lens system, the focal length of the three-piece optical lens system is f, the distance between the object-side surface of the first lens element and the image plane is TL, and they satisfy the relation: 0.4<|f/TL|<0.8. If |f/TL| satisfies the above relation, the total track length of the optical lens system can be relatively short, and the requirement of miniaturization can be satisfied.

The present invention will be presented in further details from the following descriptions with the accompanying drawings, which show, for purpose of illustrations only, the preferred embodiments in accordance with the present invention.

DETAILED DESCRIPTION OF THE PREFERRED EMBODIMENTS

Figure 1A:
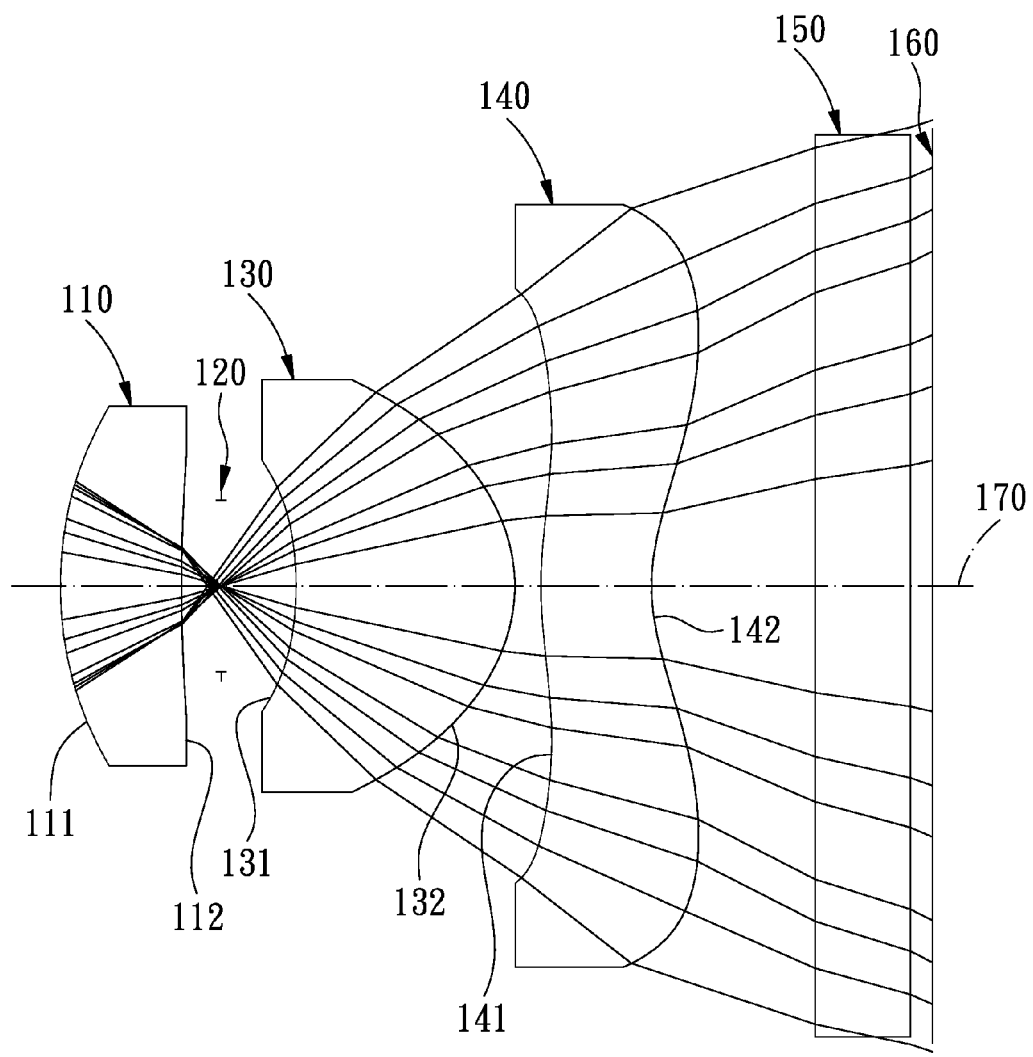
FIG. 1A shows an optical lens system in accordance with a first embodiment of the present invention.
Figure 1B:
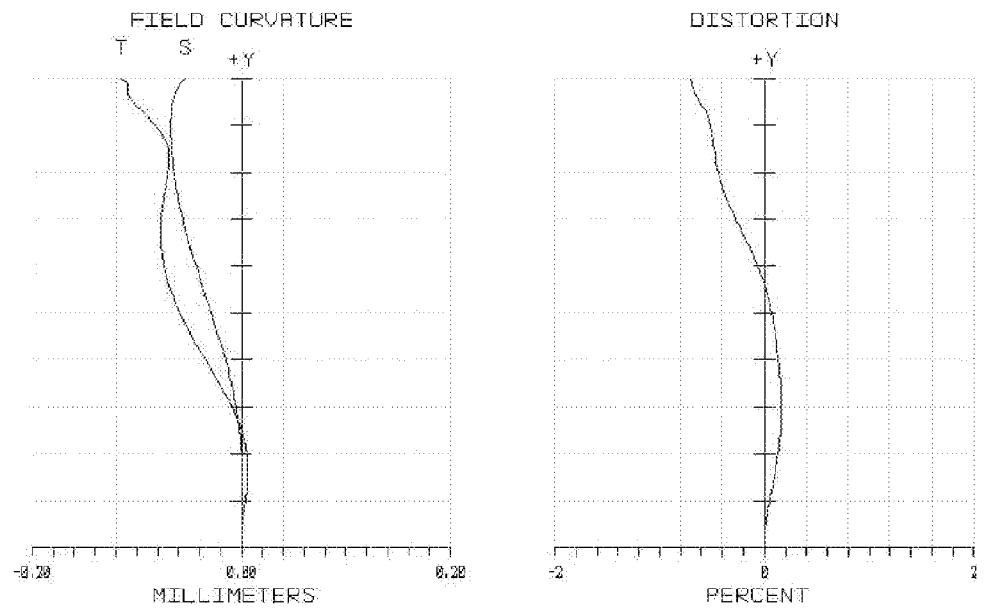
FIG. 1B shows the longitudinal spherical aberration curve, the astigmatic field curve, and the distortion curve of the first embodiment of the present invention.
Figure 1B:
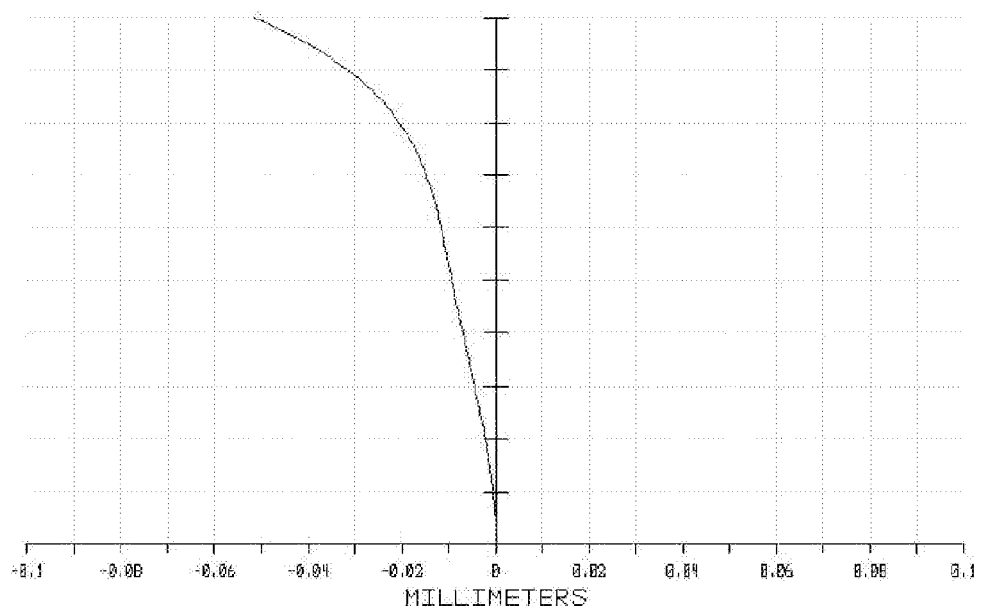

Referring to FIG. 1A, which shows a three-piece optical lens system in accordance with a first embodiment of the present invention, and FIG. 1B shows the longitudinal spherical aberration curves, the astigmatic field curves, and the distortion curve of the first embodiment of the present invention. A three-piece optical lens system in accordance with the first embodiment of the present invention comprises, in order from the object side A to the image side B:

A first lens element 110 with a positive refractive power made of plastic has a convex object-side surface 111 and a concave image-side surface 112, and the object-side surface 111 and the image-side surface 112 of the first lens element 110 are aspheric.

A Stop 120.

A second lens element 130 with a negative refractive power made of plastic has a concave object-side surface 131 and a convex image-side surface 132, and the object-side surface 131 and the image-side surface 132 of the second lens element 130 are aspheric.

A third lens element 140 with a positive refractive power made of plastic has a convex object-side surface 141 and a concave image-side surface 142, and the object-side surface 141 and the image-side surface 142 of the third lens element 140 are aspheric.

An IR cut filter 150 made of glass is located between the image-side surface 142 of the third lens element 140 and an image plane 160 and has no influence on the focal length of the three-piece optical lens system.

The equation for the aspheric surface profiles of the first embodiment is expressed as follows:

$$z = \frac{ch^2}{1+[1-(k+1)c^2h^2]^{0.5}} + Ah^4 + Bh^6 + Ch^8 + Dh^{10} + Eh^{12} + Gh^{14} + \ldots$$

wherein:

z represents the value of a reference position with respect to a vertex of the surface of a lens and a position with a height h along the optical axis 170;

k represents the conic constant;

c represents the reciprocal of the radius of curvature;

A、B、C、D、E、G、... : represent the high-order aspheric coefficients.

In the first embodiment of the present three-piece optical lens system, the focal length of the three-piece optical lens system is f, and it satisfies the relation:

f=1.64.

In the first embodiment of the present invention three-piece optical lens system, the f-number of the three-piece optical lens system is Fno, and it satisfies the relation:

Fno=2.4.

In the first embodiment of the present invention three-piece optical lens system, the field of view of the three-piece optical lens system is $2\omega$, and it satisfies the relation:

$2\omega$=83:

In the first embodiment of the present invention three-piece optical lens system, the refractive index of the third lens element 140 is N3, the Abbe number of the third lens element 140 is V3, and they satisfy the relations:

N3=1.634;

V3=23.8.

In the first embodiment of the present invention three-piece optical lens system, the focal length of the first lens element 110 is f1, the focal length of the second lens element 130 is f2, and they satisfy the relation:

|f1|/|f2|=1.976.

In the first embodiment of the present invention three-piece optical lens system, the focal length of the second lens element 130 is f2, the focal length of the third lens element 140 is f3, and they satisfy the relation:

|f2|/|f3|=0.586.

In the first embodiment of the present invention three-piece optical lens system, the focal length of the first lens element 110 and the second lens element 130 combined is f12, the focal length of the third lens element 140 is f3, and they satisfy the relation:

|f12|/|f3|=0.569.

In the first embodiment of the present invention three-piece optical lens system, the focal length of the first lens element 110 is f1, the focal length of the second lens element 130 and the third lens element 140 combined is f23, and they satisfy the relation:

|f1|/|f23|=1.032.

In the first embodiment of the present invention three-piece optical lens system, the focal length of the three-piece optical lens system is f, the focal length of the first lens element 110 and the second lens element 130 combined is f12, and they satisfy the relation:

|f12|/|f|=0.81.

In the first embodiment of the present invention three-piece optical lens system, the focal length of the three-piece optical lens system is f, the focal length of the second lens element 130 and the third lens element 140 combined is f23, and they satisfy the relation:

|f23|/|f|=1.597.

In the first embodiment of the present invention three-piece optical lens system, the focal length of the three-piece optical lens system is f, the distance between the object-side surface 111 of the first lens element 110 and the image plane 160 is TL, and they satisfy the relation:

$|f/TL|=0.596.$

The detailed optical data of the first embodiment is shown in table 1, and the aspheric surface data is shown in table 2, wherein the units of the radius of curvature, the thickness and the focal length are expressed in mm. In the tables 1 and 2, the surfaces 1 and 2 represent the object-side surface 111 and the image-side surface 112 of the first lens element 110, respectively, the surfaces 4 and 5 represent the object-side surface 131 and the image-side surface 132 of the second lens element 130, respectively, and the surfaces 6 and 7 represent the object-side surface 141 and the image-side surface 142 of the third lens element 140, respectively.

convex image-side surface 232, and the object-side surface 231 and the image-side surface 232 of the second lens element 230 are aspheric.

A third lens element 240 with a positive refractive power made of plastic has a convex object-side surface 241 and a concave image-side surface 242, and the object-side surface 241 and the image-side surface 242 of the third lens element 240 are aspheric.

An IR cut filter 250 made of glass is located between the image-side surface 242 of the third lens element 240 and an image plane 260 and has no influence on the focal length of the three-piece optical lens system.

The equation for the aspheric surface profiles of the second embodiment is expressed as follows:

TABLE 1

(Embodiment 1)
f(focal length) = 1.64 mm, Fno = 2.4, 2ω = 83°.

| Surface # | | Curvature Radius | Thickness | Material | nd | vd |
|---|---|---|---|---|---|---|
| 0 | Object | Infinity | Infinity | | | |
| 1 | Lens 1 | 1.207792(ASP) | 0.381825 | Plastic | 1.535 | 56 |
| 2 | | 6.413388(ASP) | 0.124712 | | | |
| 3 | Stop | Infinity | 0.236605 | | | |
| 4 | Lens 2 | −0.994232(ASP) | 0.689675 | Plastic | 1.535 | 56 |
| 5 | | −0.524721(ASP) | 0.082082 | | | |
| 6 | Lens 3 | 1.331715(ASP) | 0.348668 | Plastic | 1.634 | 23.8 |
| 7 | | 0.631244(ASP) | 0.516685 | | | |
| 8 | IR-filter | Infinity | 0.3 | Glass | 1.5168 | 64.167336 |
| 9 | | Infinity | 0.068899 | | | |
| 10 | Image | Infinity | | | | |

TABLE 2

Aspheric Coefficients

| | Surface # | | | | |
|---|---|---|---|---|---|
| 1 | 2 | 4 | 5 | 6 | 7 |
| k = 1.42846 | 93.66595 | 4.589553 | −3.30019 | 0.386114 | −5.33595 |
| A = 0.068543 | 0.299725 | 0.734469 | −2.17333 | −1.60073 | −0.53411 |
| B = −0.25053 | −1.73904 | −20.2167 | 4.239719 | 3.34629 | 0.7259 |
| C = 0.025948 | −1.5627 | 190.0684 | −5.18204 | −5.60401 | −0.78037 |
| D = 1.383411 | 8.109434 | −1035.59 | −11.3807 | 5.667324 | 0.493352 |
| E = −7.61168 | 6.90288 | 3599.381 | 23.20668 | −2.53024 | −0.14459 |

Figure 2A:
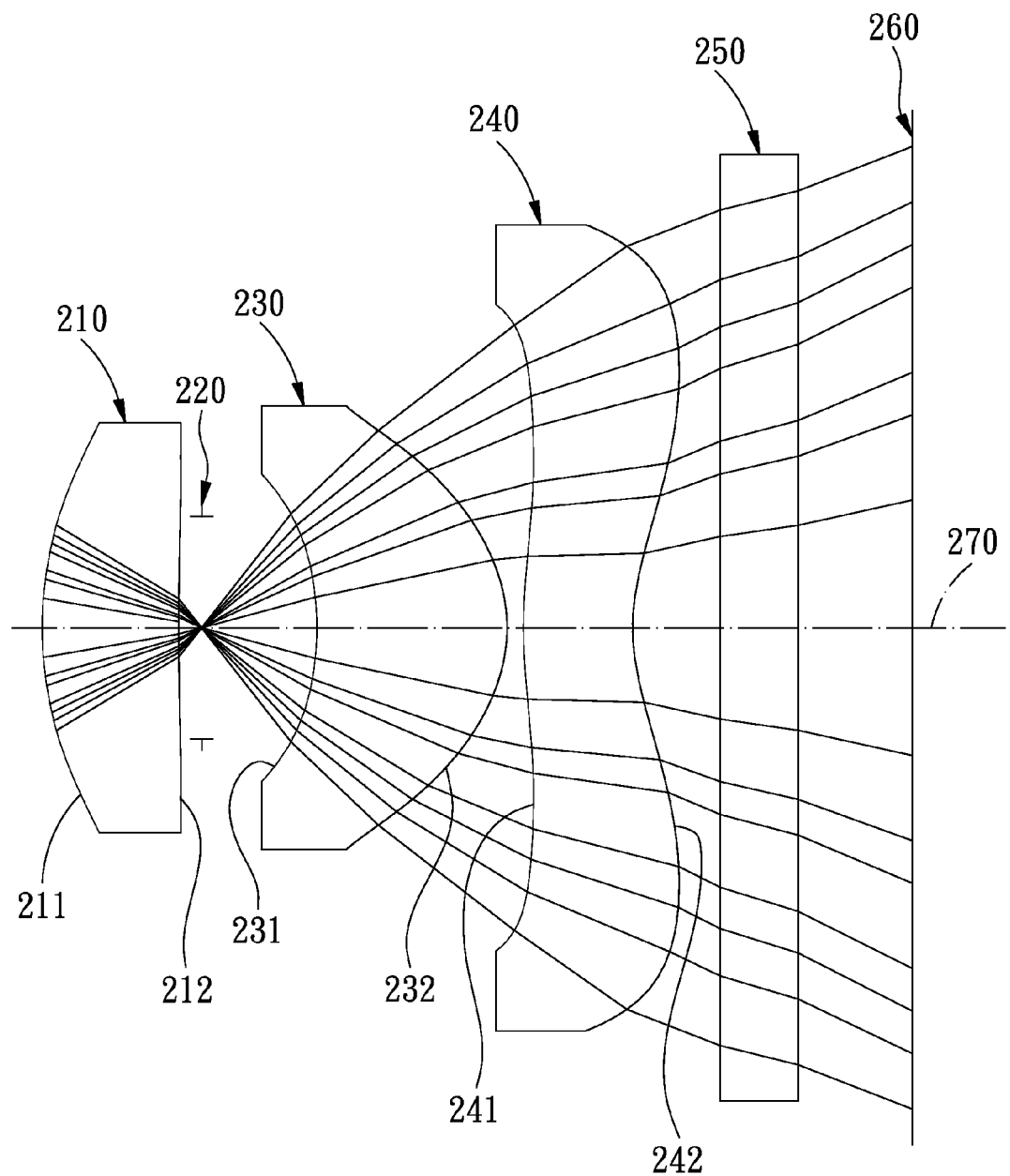
FIG. 2A shows an optical lens system in accordance with a second embodiment of the present invention.
Figure 2B:
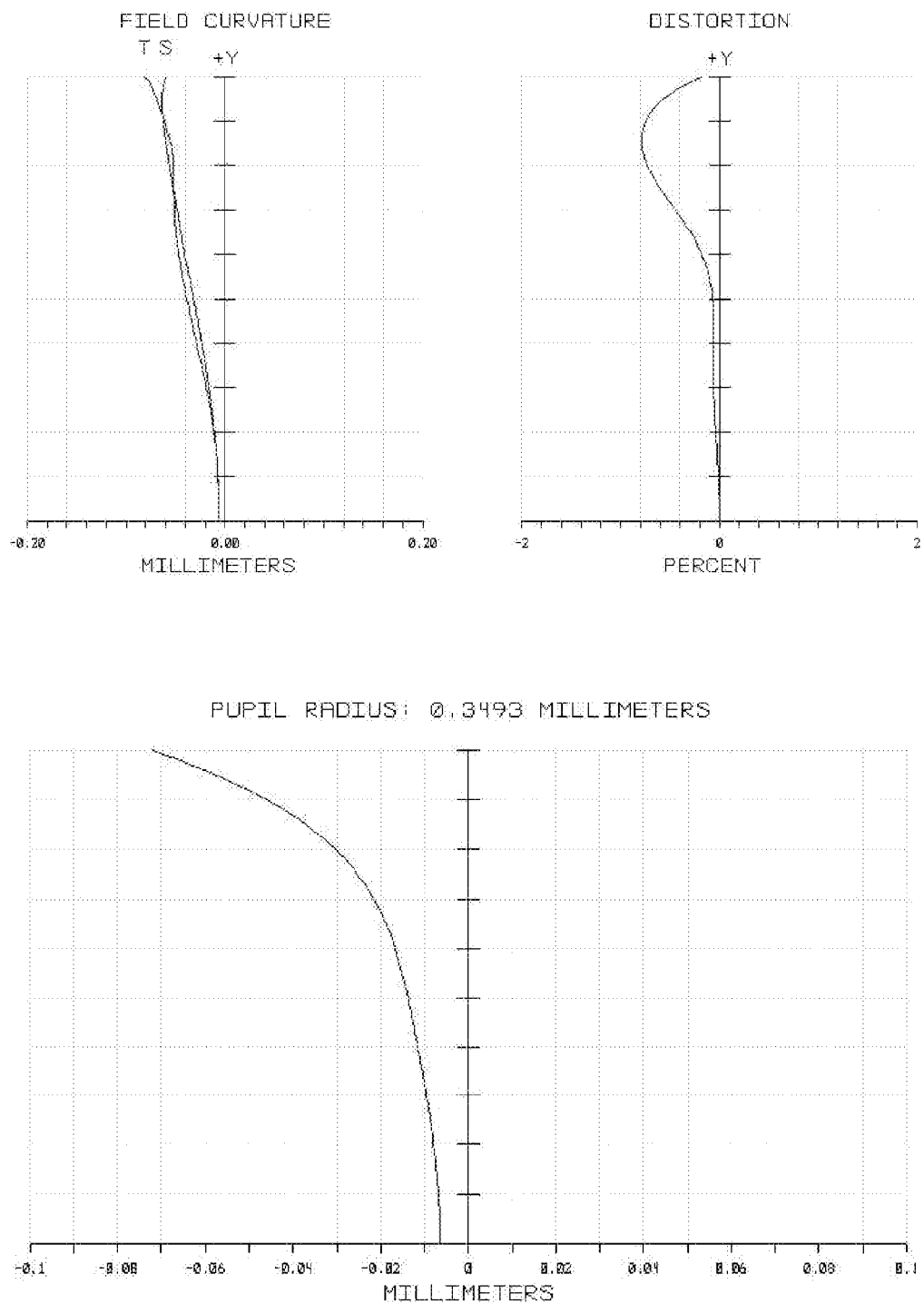
FIG. 2B shows the longitudinal spherical aberration curve, the astigmatic field curve, and the distortion curve of the second embodiment of the present invention.

Referring to FIG. 2A, which shows a three-piece optical lens system in accordance with a second embodiment of the present invention, and FIG. 2B shows the longitudinal spherical aberration curves, the astigmatic field curves, and the distortion curve of the second embodiment of the present invention. The second embodiment of the present invention comprises, in order from the object side A to the image side B:

A first lens element 210 with a positive refractive power made of plastic has a convex object-side surface 211 and a concave image-side surface 212, and the object-side surface 211 and the image-side surface 212 of the first lens element 210 are aspheric.

A Stop 220.

A second lens element 230 with a negative refractive power made of plastic has a concave object-side surface 231 and a $$z = \frac{ch^2}{1+[1-(k+1)c^2h^2]^{0.5}} + Ah^4 + Bh^6 + Ch^8 + Dh^{10} + Eh^{12} + Gh^{14} + \ldots$$

wherein:

z represents the value of a reference position with respect to a vertex of the surface of a lens and a position with a height h along the optical axis 270;

k represents the conic constant;

c represents the reciprocal of the radius of curvature;

A、B、C、D、E、G、... : represent the high-order aspheric coefficients. In the second embodiment of the present three-piece optical lens system, the focal length of the three-piece optical lens system is f, and it satisfies the relation:

f=1.53.

In the second embodiment of the present three-piece optical lens system, the f-number of the three-piece optical lens system is Fno, and it satisfies the relation:

$Fno=2.0$.

In the second embodiment of the present three-piece optical lens system, the field of view of the three-piece optical lens system is $2\omega$, and it satisfies the relation:

$2\omega=79$:

In the second embodiment of the present three-piece optical lens system, the refractive index of the third lens element 240 is N3, the Abbe number of the third lens element 240 is V3, and they satisfy the relations:

$N3=1.632$;

$V3=23$.

In the second embodiment of the present three-piece optical lens system, the focal length of the first lens element 210 is f1, the focal length of the second lens element 230 is f2, and they satisfy the relation:

$|f1|/|f2|=1.802$.

In the second embodiment of the present three-piece optical lens system, the focal length of the second lens element 230 is f2, the focal length of the third lens element 240 is f3, and they satisfy the relation:

$|f2|/|f3|=0.724$.

In the second embodiment of the present three-piece optical lens system, the focal length of the first lens element 210 and the second lens element 230 combined is f12, the focal length of the third lens element 240 is f3, and they satisfy the relation:

$|f12|/|f3|=0.709$.

In the second embodiment of the present three-piece optical lens system, the focal length of the second lens element 230 and the third lens element 240 combined is f23, the focal length of the first lens element 210 is f1, and they satisfy the relation:

$|f1|/|f23|=0.634$.

In the second embodiment of the present three-piece optical lens system, the focal length of the three-piece optical lens system is f, the focal length of the first lens element 210 and the second lens element 230 combined is f12, and they satisfy the relation:

$f12|/|f|=\mathbf{0.745}$.

In the second embodiment of the present three-piece optical lens system, the focal length of the three-piece optical lens system is f, the focal length of the second lens element 230 and the third lens element 240 combined is f23, and they satisfy the relation:

$|f23|/|f|=2.163$.

In the second embodiment of the present three-piece optical lens system, the focal length of the three-piece optical lens system is f, the distance between the object-side surface 211 of the first lens element 210 and the image plane 260 is TL, and they satisfy the relation:

$|f/TL|=0.652$.

The detailed optical data of the second embodiment is shown in table 3, and the aspheric surface data is shown in table 4, wherein the units of the radius of curvature, the thickness and the focal length are expressed in mm. In the tables 3 and 4, the surfaces 1 and 2 represent the object-side surface 211 and the image-side surface 212 of the first lens element 210, respectively, the surfaces 4 and 5 represent the object-side surface 231 and the image-side surface 232 of the second lens element 230, respectively, and the surfaces 6 and 7 represent the object-side surface 241 and the image-side surface 242 of the third lens element 240, respectively.

TABLE 3

(Embodiment 2)
f(focal length) = 1.53 mm, Fno = 2.0, 2ω = 79°.

| Surface # | | Curvature Radius | Thickness | Material | nd | vd |
|---|---|---|---|---|---|---|
| 0 | Object | Infinity | Infinity | | | |
| 1 | Lens 1 | 1.018658(ASP) | 0.368546 | Plastic | 1.535 | 56 |
| 2 | | 9.162535(ASP) | 0.061668 | | | |
| 3 | Stop | Infinity | 0.311096 | | | |
| 4 | Lens 2 | −0.81862(ASP) | 0.513284 | Plastic | 1.535 | 56 |
| 5 | | −0.43252(ASP) | 0.044321 | | | |
| 6 | Lens 3 | 1.451375(ASP) | 0.294357 | Plastic | 1.632 | 23 |
| 7 | | 0.554059(ASP) | 0.236829 | | | |
| 8 | IR-filter | Infinity | 0.21 | Glass | 1.5168 | 64.167336 |
| 9 | | Infinity | 0.308183 | | | |
| 10 | Image | Infinity | | | | |

TABLE 4

Aspheric Coefficients

| | Surface # | | | | | |
|---|---|---|---|---|---|---|
| | 1 | 2 | 4 | 5 | 6 | 7 |
| k = | 0.872352 | −118.1303 | 2.323299 | −2.837341 | 0.887843 | −6.182162 |
| A = | −0.09754 | 0.084314 | 0.325379 | −2.16915 | −1.68209 | −0.6683 |
| B = | −0.25811 | −1.17987 | −17.0153 | 3.735106 | 3.780999 | 0.936757 |
| C = | −0.08734 | 1.327168 | 183.4481 | −5.52424 | −6.09281 | −0.97563 |
| D = | −0.5966 | −7.86312 | −1145.87 | −11.6855 | 6.231298 | 0.569988 |

TABLE 4-continued

Aspheric Coefficients

| | Surface # | | | | | |
|---|---|---|---|---|---|---|
| | 1 | 2 | 4 | 5 | 6 | 7 |
| E = | −4.40427 | −138.915 | 4330.385 | 30.29379 | −3.49097 | −0.13994 |
| F = | −14.4538 | 775.38 | −4622.8 | 44.80149 | 0.202775 | −0.04572 |

Figure 3A:
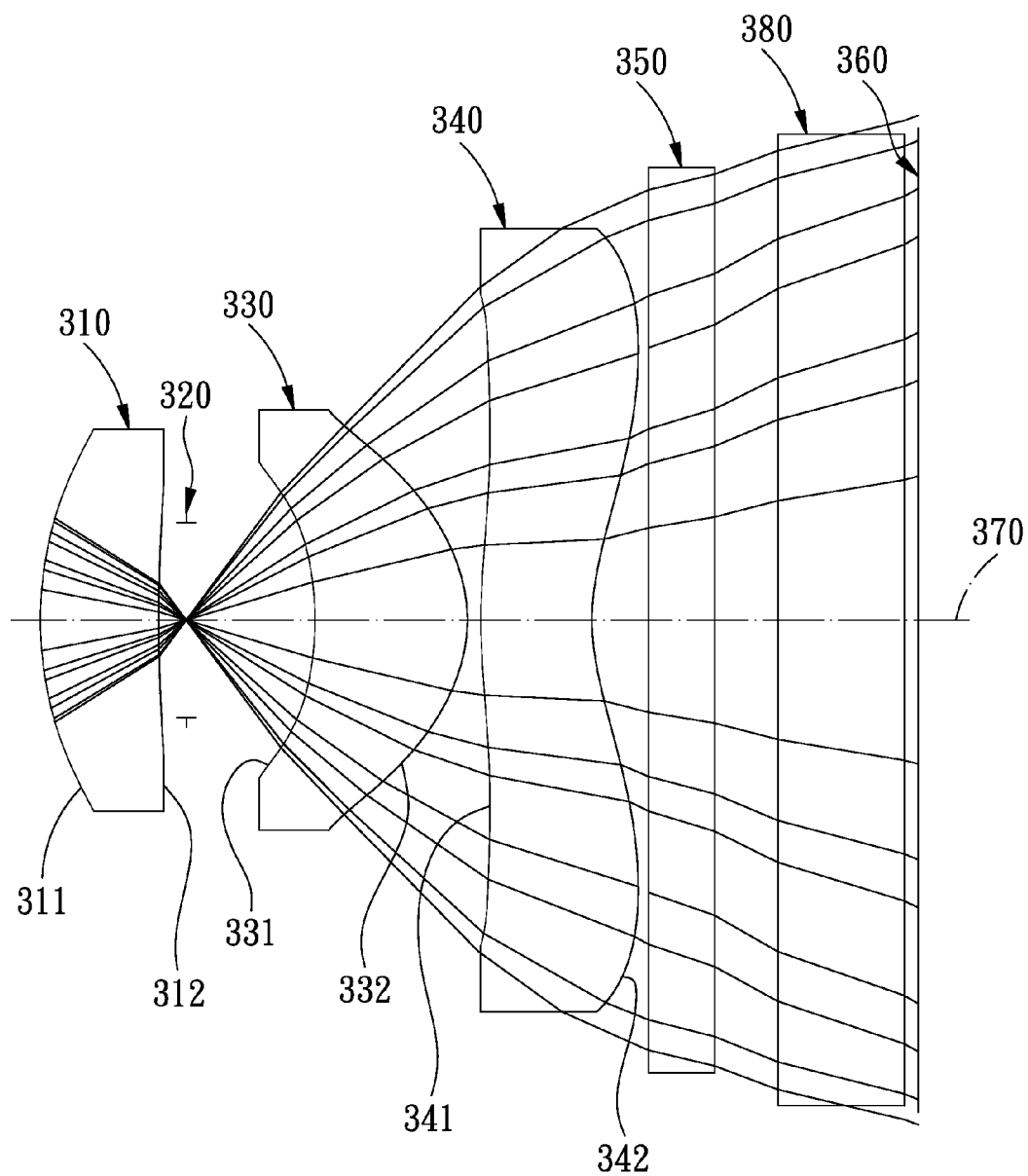
FIG. 3A shows an optical lens system in accordance with a third embodiment of the present invention.
Figure 3B:
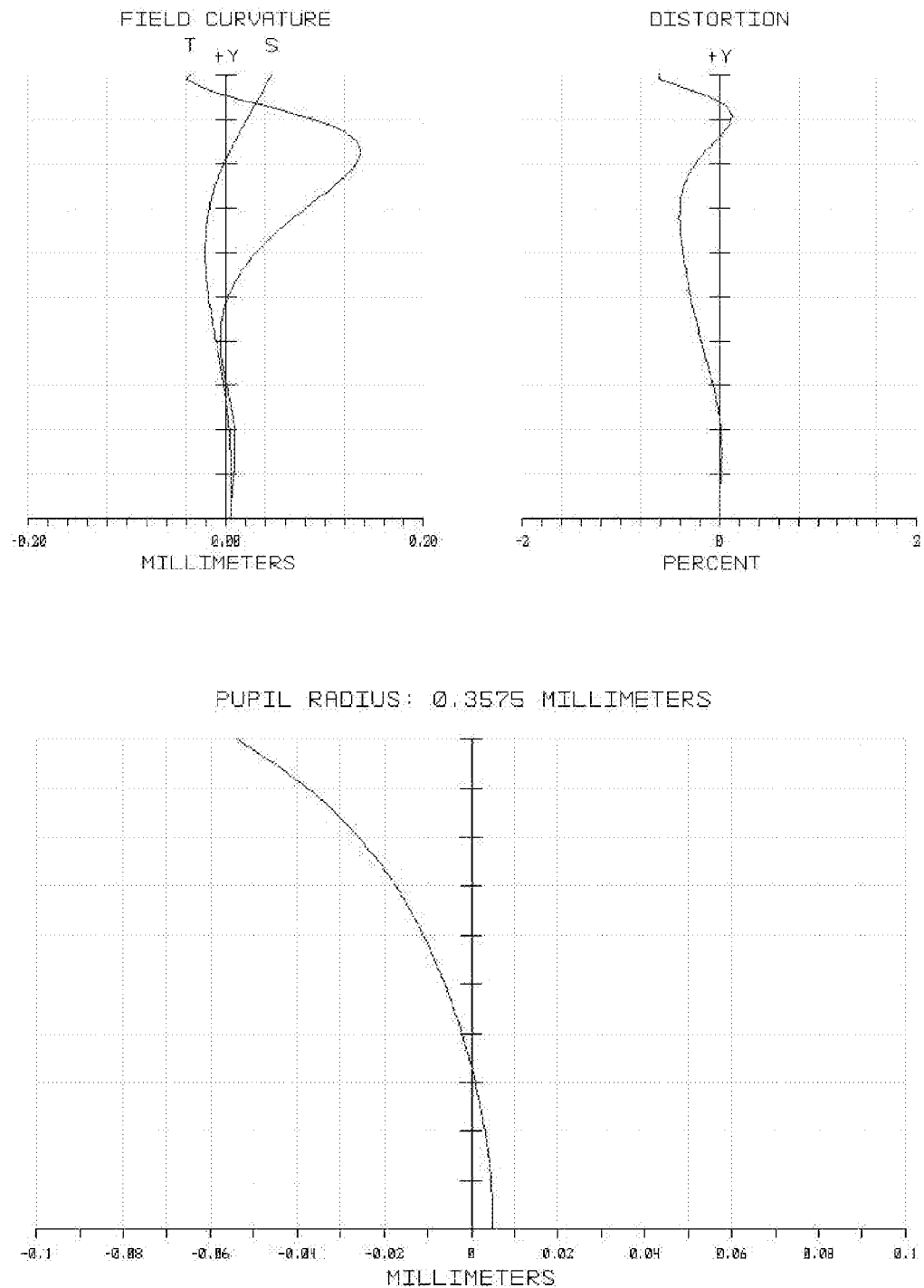
FIG. 3B shows the longitudinal spherical aberration curve, the astigmatic field curve, and the distortion curve of the third embodiment of the present invention.

Referring to FIG. 3A, which shows a three-piece optical lens system in accordance with a third embodiment of the present invention, and FIG. 3B shows the longitudinal spherical aberration curves, the astigmatic field curves, and the distortion curve of the third embodiment of the present invention. The third embodiment of the present invention comprises, in order from the object side A to the image side B:

A first lens element 310 with a positive refractive power made of plastic has a convex object-side surface 311 and a concave image-side surface 312, and the object-side surface 311 and the image-side surface 312 of the first lens element 310 are aspheric.

A Stop 320.

A second lens element 330 with a negative refractive power made of plastic has a concave object-side surface 331 and a convex image-side surface 332, and the object-side surface 331 and the image-side surface 332 of the second lens element 330 are aspheric.

A third lens element 340 with a positive refractive power made of plastic has a convex object-side surface 341 and a concave image-side surface 342, and the object-side surface 341 and the image-side surface 342 of the third lens element 340 are aspheric.

An IR cut filter 350 made of glass is located between the image-side surface 342 of the third lens element 340 and an image plane 360 and has no influence on the focal length of the optical lens system.

A cover glass 380 made of glass is located between the IR cut filter 350 and the image plane 360 to protect a sensor (not shown), and has no influence on the focal length of the three-piece optical lens system.

The equation for the aspheric surface profiles of the third embodiment is expressed as follows:

$$z = \frac{ch^2}{1+[1-(k+1)c^2h^2]^{0.5}} + Ah^4 + Bh^6 + Ch^8 + Dh^{10} + Eh^{12} + Gh^{14} + \ldots$$

wherein:

z represents the value of a reference position with respect to a vertex of the surface of a lens and a position with a height h along the optical axis 370 k represents the conic constant;

c represents the reciprocal of the radius of curvature;

A、B、C、D、E、G、... : represent the high-order aspheric coefficients.

In the third embodiment of the present three-piece optical lens system, the focal length of the three-piece optical lens system is f, and it satisfies the relation:

f=1.82.

In the third embodiment of the present three-piece optical lens system, the f-number of the three-piece optical lens system is Fno, and it satisfies the relation:

Fno=2.4.

In the third embodiment of the present three-piece optical lens system, the field of view of the three-piece optical lens system is 2ω, and it satisfies the relation:

2ω=82:

In the third embodiment of the present three-piece optical lens system, the refractive index of the third lens element 340 is N3, the Abbe number of the third lens element 340 is V3, and they satisfy the relations:

N3=1.612;

V3=26.

In the third embodiment of the present three-piece optical lens system, the focal length of the first lens element 310 is f1, the focal length of the second lens element 330 is f2, and they satisfy the relation:

|f1|/|f2|=1.963.

In the third embodiment of the present three-piece optical lens system, the focal length of the second lens element 330 is f2, the focal length of the third lens element 340 is f3, and they satisfy the relation:

|f2|/|f3|=0.753.

In the third embodiment of the present three-piece optical lens system, the focal length of the first lens element 310 and the second lens element 330 combined is f12, the focal length of the third lens element 340 is f3, and they satisfy the relation:

|f12|/|f3|=0.73.

In the third embodiment of the present three-piece optical lens system, the focal length of the second lens element 330 and the third lens element 340 combined is f23, the focal length of the first lens element 310 is f1, and they satisfy the relation:

|f1|/|f23|=0.672.

In the third embodiment of the present three-piece optical lens system, the focal length of the three-piece optical lens system is f, the focal length of the first lens element 310 and the second lens element 330 combined is f12, and they satisfy the relation:

|f12|/|f|=0.714.

In the third embodiment of the present three-piece optical lens system, the focal length of the three-piece optical lens system is f, the focal length of the second lens element 330 and the third lens element 340 combined is f23, and they satisfy the relation:

|f23|/|f|=2.152.

In the third embodiment of the present three-piece optical lens system, the focal length of the three-piece optical lens system is f, the distance between the object-side surface 311 of the first lens element 310 and the image plane 360 is TL, and they satisfy the relation:

|f/TL|=0.654.

The detailed optical data of the third embodiment is shown in table 5, and the aspheric surface data is shown in table 6, wherein the units of the radius of curvature, the thickness and the focal length are expressed in mm. In the tables 5 and 6, the surfaces 1 and 2 represent the object-side surface 311 and the image-side surface 312 of the first lens element 310, respectively, the surfaces 4 and 5 represent the object-side surface 331 and the image-side surface 332 of the second lens element 330, respectively, and the surfaces 6 and 7 represent the object-side surface 341 and the image-side surface 342 of the third lens element 340, respectively.

convex image-side surface 432, and the object-side surface 431 and the image-side surface 432 of the second lens element 430 are aspheric.

A third lens element 440 with a positive refractive power made of plastic has a convex object-side surface 441 and a concave image-side surface 442, and the object-side surface 441 and the image-side surface 442 of the third lens element 440 are aspheric.

An IR cut filter 450 made of glass is located between the image-side surface 442 of the third lens element 440 and an image plane 460 and has no influence on the focal length of the three-piece optical lens system.

The equation for the aspheric surface profiles of the fourth embodiment is expressed as follows:

TABLE 5

(Embodiment 3)
f(focal length) = 1.82 mm, Fno = 2.4, 2ω = 82°.

| Surface # | | Curvature Radius | Thickness | Material | nd | vd |
|---|---|---|---|---|---|---|
| 0 | Object | Infinity | Infinity | | | |
| 1 | Lens 1 | 1.157237(ASP) | 0.375208 | Plastic | 1.535 | 56 |
| 2 | | 5.679283(ASP) | 0.086905 | | | |
| 3 | Stop | Infinity | 0.408079 | | | |
| 4 | Lens 2 | −0.980386(ASP) | 0.48273 | Plastic | 1.535 | 56 |
| 5 | | −0.486358(ASP) | 0.042475 | | | |
| 6 | Lens 3 | 2.052499(ASP) | 0.351495 | Plastic | 1.612 | 26 |
| 7 | | 0.682256(ASP) | 0.16907 | | | |
| 8 | IR-filter | Infinity | 0.21 | Glass | 1.5168 | 64.167336 |
| 9 | | Infinity | 0.2 | | | |
| 10 | Cover | Infinity | 0.4 | Glass | 1.5168 | 64.167336 |
| 11 | Glass | Infinity | 0.045 | | | |
| 12 | Image | Infinity | | | | |

TABLE 6

Aspheric Coefficients

| | Surface # | | | | | |
|---|---|---|---|---|---|---|
| | 1 | 2 | 4 | 5 | 6 | 7 |
| k = | 0.815092 | 15.62383 | 2.215985 | −3.13406 | 2.200667 | −7.3661 |
| A = | −0.0475 | 0.047567 | 0.237145 | −1.52237 | −0.85334 | −0.3253 |
| B = | −0.02503 | −0.37735 | −7.90144 | 1.93684 | 1.386517 | 0.315208 |
| C = | −0.24343 | −0.19218 | 47.12193 | −2.20156 | −1.51974 | −0.25094 |
| D = | −0.01857 | −6.42683 | −180.392 | −2.50398 | 0.980679 | 0.126773 |
| E = | −1.43995 | 22.44807 | 377.0114 | 12.72607 | −0.31327 | −0.03353 |
| F = | −0.16459 | 11.38928 | 227.0883 | 1.357769 | −0.85334 | −0.3253 |

Figure 4A:
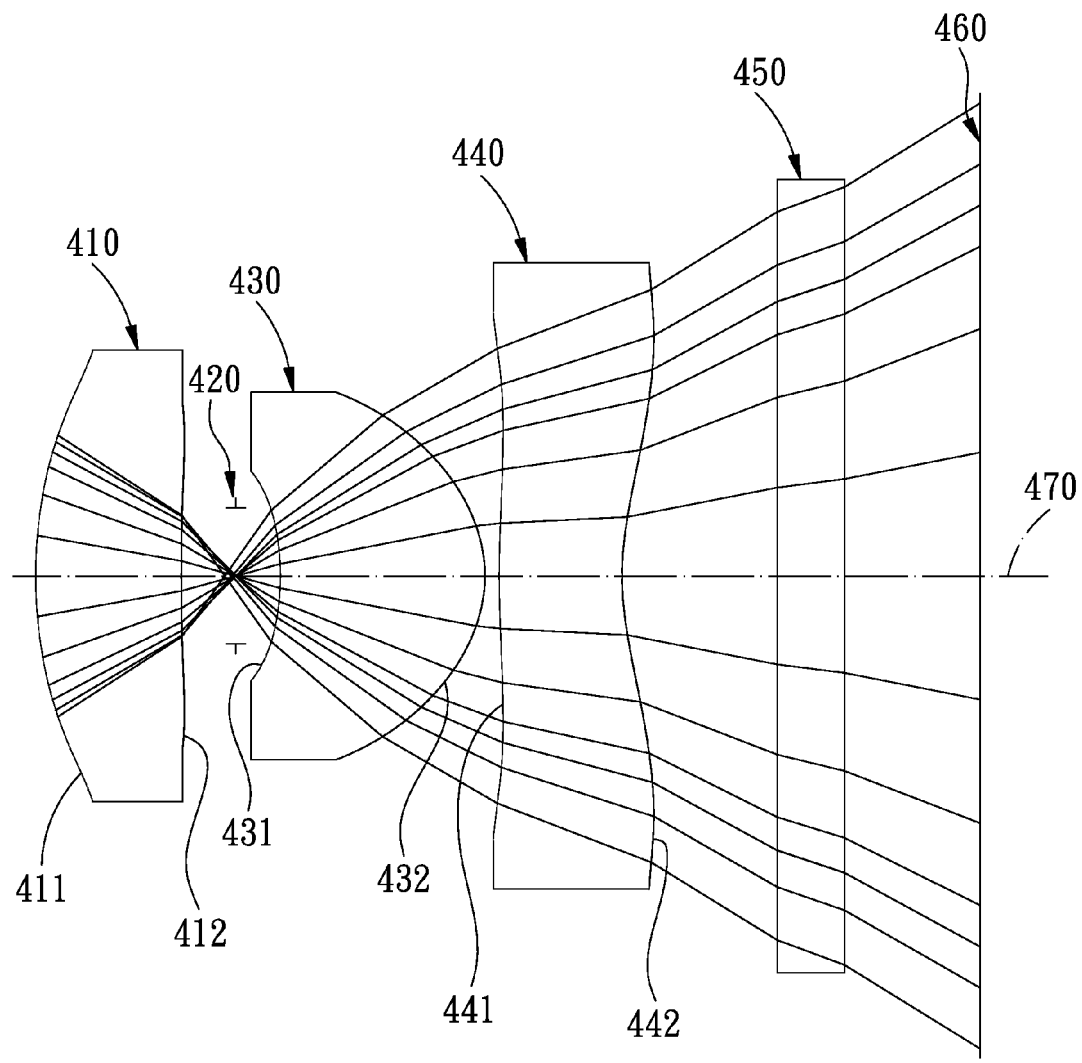
FIG. 4A shows an optical lens system in accordance with a fourth embodiment of the present invention.
Figure 4B:
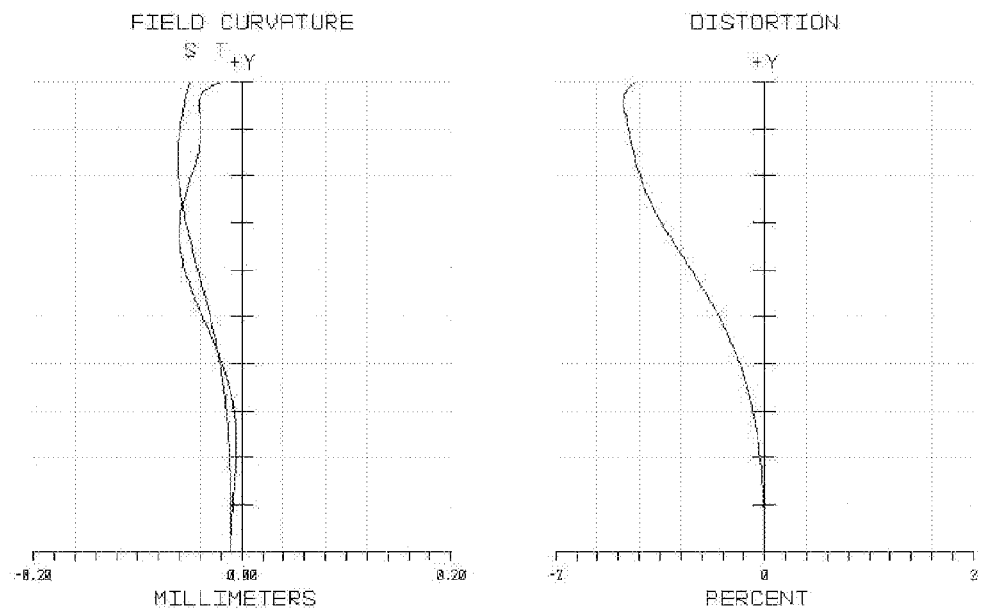
FIG. 4B shows the longitudinal spherical aberration curve, the astigmatic field curve, and the distortion curve of the fourth embodiment of the present invention.
Figure 4B:
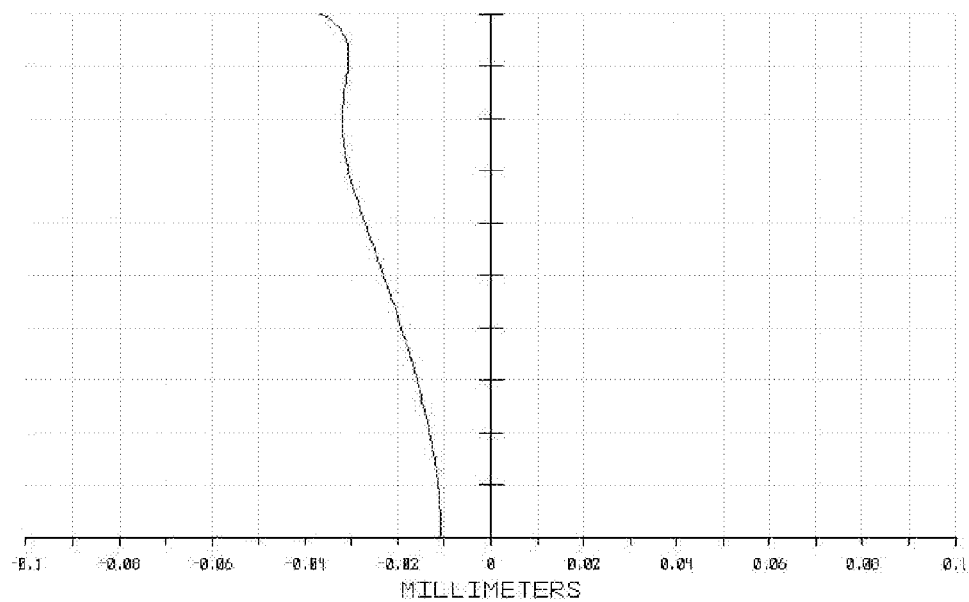
Figure 5:
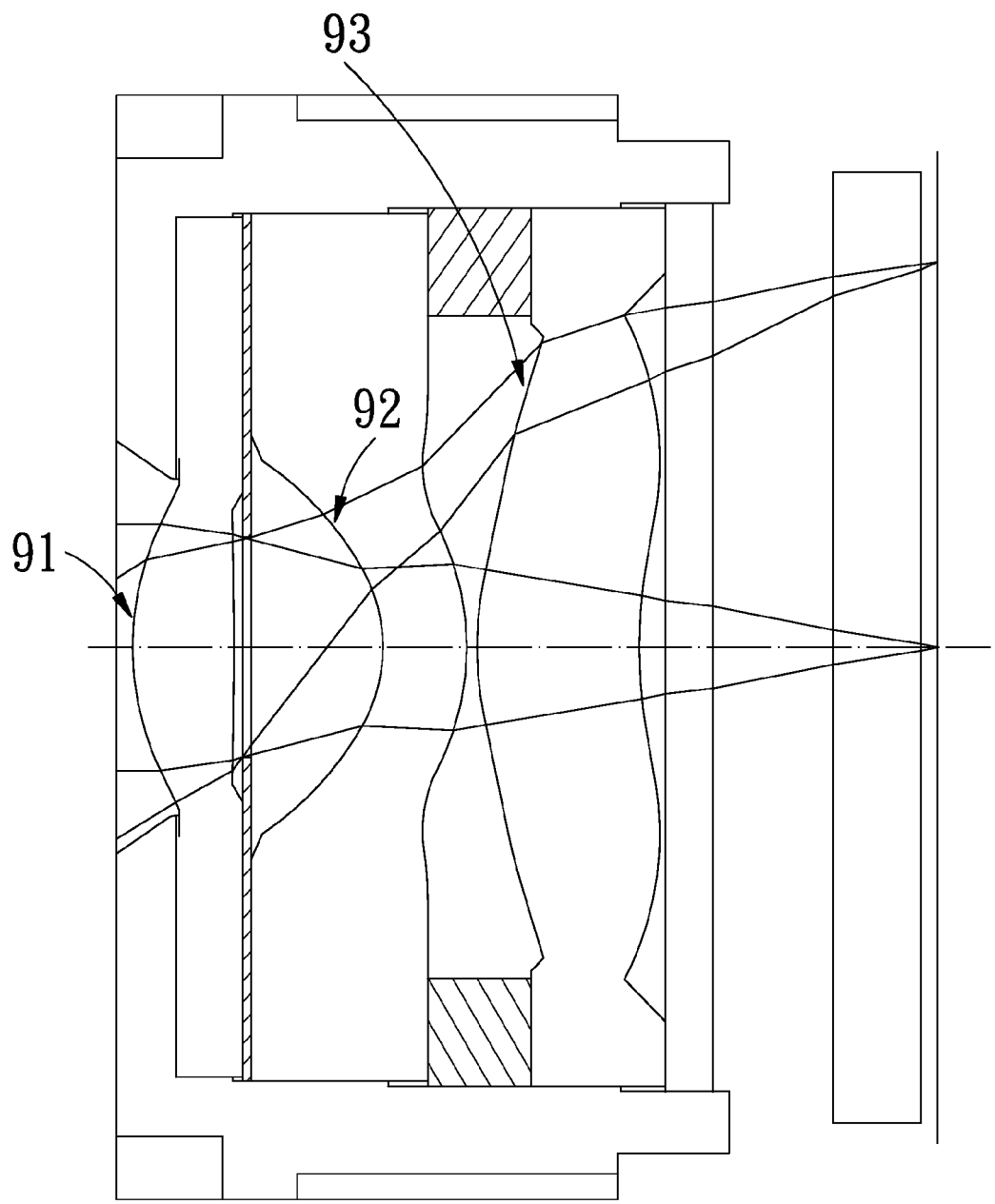
FIG. 5 shows a conventional three-piece optical lens system.

Referring to FIG. 4A, which shows a three-piece optical lens system in accordance with a fourth embodiment of the present invention, and FIG. 4B shows the longitudinal spherical aberration curves, the astigmatic field curves, and the distortion curve of the fourth embodiment of the present invention. The fourth embodiment of the present invention comprises, in order from the object side A to the image side B:

A first lens element 410 with a positive refractive power made of plastic has a convex object-side surface 411 and a concave image-side surface 412, and the object-side surface 411 and the image-side surface 412 of the first lens element 410 are aspheric.

A Stop 420.

A second lens element 430 with a negative refractive power made of plastic has a concave object-side surface 431 and a $$z = \frac{ch^2}{1 + [1 - (k+1)c^2h^2]^{0.5}} + Ah^4 + Bh^6 + Ch^8 + Dh^{10} + Eh^{12} + Gh^{14} + \ldots$$

wherein:

z represents the value of a reference position with respect to a vertex of the surface of a lens and a position with a height h along the optical axis 470 k represents the conic constant;

c represents the reciprocal of the radius of curvature;

A、B、C、D、E、G、. . . : represent the high-order aspheric coefficients. In the fourth embodiment of the present three-piece optical lens system, the focal length of the three-piece optical lens system is f, and it satisfies the relation:

f=1.67.

In the fourth embodiment of the present three-piece optical lens system, the f-number of the three-piece optical lens system is Fno, and it satisfies the relation:

Fno=2.4.

In the fourth embodiment of the present three-piece optical lens system, the field of view of the three-piece optical lens system is 2ω, and it satisfies the relation:

2ω=81:

In the fourth embodiment of the present three-piece optical lens system, the refractive index of the third lens element 440 is N3, the Abbe number of the third lens element 440 is V3, and they satisfy the relations:

N3=1.607

V3=27.

In the fourth embodiment of the present three-piece optical lens system, the focal length of the first lens element 410 is f1, the focal length of the second lens element 430 is f2, and they satisfy the relation:

|f1|/|f2|=3.089

In the fourth embodiment of the present three-piece optical lens system, the focal length of the second lens element 430 is f2, the focal length of the third lens element 440 is f3, and they satisfy the relation:

|f2|/|f3|=0.551

In the fourth embodiment of the present three-piece optical lens system, the focal length of the first lens element 410 and the second lens element 430 combined is f12, the focal length of the third lens element 440 is f3, and they satisfy the relation:

|f12|/|f3|=0.572.

In the fourth embodiment of the present three-piece optical lens system, the focal length of the first lens element 410 is f1, the focal length of the second lens element 430 and the third lens element 440 combined is f23, and they satisfy the relation:

|f1|/|f23|=1.527.

In the fourth embodiment of the present three-piece optical lens system, the focal length of the three-piece optical lens system is f, the focal length of the first lens element 410 and the second lens element 430 combined is f12, and they satisfy the relation:

|f12|/|f|=0.68.

In the fourth embodiment of the present three-piece optical lens system, the focal length of the three-piece optical lens system is f, the focal length of the second lens element 430 and the third lens element 440 combined is f23, and they satisfy the relation:

|f23|/|f|=1.324.

In the fourth embodiment of the present three-piece optical lens system, the focal length of the three-piece optical lens system is f, the distance between the object-side surface 411 of the first lens element 410 and the image plane 460 is TL, and they satisfy the relation:

|f/TL|=0.569.

The detailed optical data of the fourth embodiment is shown in table 7, and the aspheric surface data is shown in table 8, wherein the units of the radius of curvature, the thickness and the focal length are expressed in mm. In the tables 7 and 8, the surfaces 1 and 2 represent the object-side surface 411 and the image-side surface 412 of the first lens element 410, respectively, the surfaces 4 and 5 represent the object-side surface 431 and the image-side surface 432 of the second lens element 430, respectively, and the surfaces 6 and 7 represent the object-side surface 441 and the image-side surface 442 of the third lens element 440, respectively.

TABLE 7

(Embodiment 4)
f(focal length) = 1.67 mm, Fno = 2.4, 2ω = 81°.

| Surface # | | Curvature Radius | Thickness | Material | nd | vd |
|---|---|---|---|---|---|---|
| 0 | Object | Infinity | Infinity | | | |
| 1 | Lens 1 | 1.532591(ASP) | 0.454031 | Plastic | 1.535 | 56 |
| 2 | | 8.719898(ASP) | 0.170321 | | | |
| 3 | Stop | Infinity | 0.138891 | | | |
| 4 | Lens 2 | −0.81759(ASP) | 0.638601 | Plastic | 1.535 | 56 |
| 5 | | −0.43579(ASP) | 0.043507 | | | |
| 6 | Lens 3 | 3.104954(ASP) | 0.38279 | Plastic | 1.607 | 27 |
| 7 | | 0.858346(ASP) | 0.474653 | | | |
| 8 | IR-filter | Infinity | 0.21 | Glass | 1.5168 | 64.167336 |
| 9 | | Infinity | 0.421493 | | | |
| 10 | Image | Infinity | | | | |

TABLE 8

Aspheric Coefficients

| | Surface # | | | | | |
|---|---|---|---|---|---|---|
| | 1 | 2 | 4 | 5 | 6 | 7 |
| k = | −0.51484 | 198.1856 | 2.538317 | −2.17241 | 12.14719 | −11.1481 |
| A = | 0.218489 | 0.334491 | 0.195327 | −1.47945 | −0.95368 | −0.41778 |
| B = | −0.67673 | −2.46745 | −17.2444 | −0.00932 | 3.52412 | 0.927894 |
| C = | 3.219872 | −1.93595 | 150.4772 | 8.6889 | −10.2511 | −1.64519 |

TABLE 8-continued

Aspheric Coefficients

| | Surface # | | | | | |
|---|---|---|---|---|---|---|
| | 1 | 2 | 4 | 5 | 6 | 7 |
| D = | −7.51231 | 23.63663 | −2038.48 | −52.7293 | 14.47767 | 1.41453 |
| E = | 4.80667 | −34.7034 | 10407.42 | 56.92328 | −7.80196 | −0.43665 |

TABLE 9

| | Embodiment 1 | Embodiment 2 | Embodiment 3 | Embodiment 4 |
|---|---|---|---|---|
| f | 1.64 | 1.53 | 1.82 | 1.67 |
| Fno | 2.4 | 2.0 | 2.4 | 2.4 |
| 2ω | 83 | 79 | 82 | 81 |
| N3 | 1.634 | 1.632 | 1.612 | 1.607 |
| V3 | 23.8 | 23 | 26 | 27 |
| \|f1\|/\|f2\| | 1.976 | 1.802 | 1.963 | 3.089 |
| \|f2\|/\|f3\| | 0.586 | 0.724 | 0.753 | 0.551 |
| \|f12\|/\|f3\| | 0.569 | 0.709 | 0.73 | 0.572 |
| \|f1\|/\|f23\| | 1.032 | 0.634 | 0.672 | 1.527 |
| \|f12\|/\|f\| | 0.81 | 0.745 | 0.714 | 0.68 |
| \|f23\|/\|f\| | 1.597 | 2.163 | 2.152 | 1.324 |
| \|f/TL\| | 0.596 | 0.652 | 0.654 | 0.569 |

It is to be noted that the tables 1-8 show different data from the different embodiments, however, the data of the different embodiments is obtained from experiments. Therefore, any product of the same structure is deemed to be within the scope of the present invention even if it uses different data. Table 9 lists the relevant data for the various embodiments of the present invention.

In the present three-piece optical lens system, the lens elements can be made of glass or plastic. If the lens elements are made of glass, there is more freedom in distributing the refractive power of the three-piece optical lens system. If the lens elements are made of plastic, the cost will be effectively reduced.

In the present three-piece optical lens system, if the object-side or the image-side surface of the lens elements is convex, the object-side or the image-side surface of the lens elements in proximity of the optical axis is convex. If the object-side or the image-side surface of the lens elements is concave, the object-side or the image-side surface of the lens elements in proximity of the optical axis is concave.

While we have shown and described various embodiments in accordance with the present invention, it should be clear to those skilled in the art that further embodiments may be made without departing from the scope of the present invention.

What is claimed is:

1. A three-piece optical lens system comprising, in order from an object side to an image side:
a first lens element with a positive refractive power having a convex object-side surface, at least one of the object-side and an image-side surfaces of the first lens element being aspheric;
a stop;
a second lens element with a positive refractive power having a concave object-side surface, at least one of the object-side and an image-side surfaces of the second lens element being aspheric;
a third lens element with a negative refractive power having a concave image-side surface, at least one of an object-side and the image-side surfaces of the third lens element being aspheric;

wherein a refractive index of the third lens element is N3, an Abbe number of the third lens element is V3, a focal length of the second lens element is f2, a focal length of the third lens element is f3, and they satisfy the relations:

$N3>1.6;$ $V3<30;$ $0.3<|f2|/|f3|<1.0.$

2. The three-piece optical lens system as claimed in claim 1, wherein a focal length of the first lens element is f1, the focal length of the second lens element is f2, and they satisfy the relation:

$1.4<|f1|/|f2|<3.5.$

3. The three-piece optical lens system as claimed in claim 1, wherein a focal length of the first lens element is f1, a focal length of the second lens element and the third lens element combined is f23, and they satisfy the relation:

$0.3<|f1|/|f23|<1.8.$

4. The three-piece optical lens system as claimed in claim 1, wherein a focal length of the first lens element and the second lens element combined is f12, the focal length of the third lens element is f3, and they satisfy the relation:

$0.3<|f12|/|f3|<1.0.$

5. The three-piece optical lens system as claimed in claim 1, wherein a focal length of the three-piece optical lens system is f, a focal length of the first lens element and the second lens element combined is f12, and they satisfy the relation:

$0.5<|f12|/|f|<1.1.$

6. The three-piece optical lens system as claimed in claim 1, wherein a focal length of the three-piece optical lens system is f, a focal length of the second lens element and the third lens element combined is f23, and they satisfy the relation:

$1.0<|f23|/|f|<2.5.$

7. The three-piece optical lens system as claimed in claim 1, wherein a focal length of the three-piece optical lens system is f, a distance between the object-side surface of the first lens element and an image plane is TL, and they satisfy the relation:

$0.4<|f/TL|<0.8.$

8. The three-piece optical lens system as claimed in claim 1, wherein the first lens element is made of plastic, the image-side surface of the first lens element is concave, and the object-side surface and the image-side surface of the first lens element are aspheric.

9. The three-piece optical lens system as claimed in claim 1, wherein the second lens element is made of plastic, the image-side surface of the second lens element is convex, and the object-side surface and the image-side surface of the second lens element are aspheric.

10. The three-piece optical lens system as claimed in claim 1, wherein the third lens element is made of plastic, the object-side surface of the third lens element is convex, and the object-side surface and the image-side surface of the third lens element are aspheric.

* * * * *